(12) United States Patent
Trattler et al.

(10) Patent No.: US 8,536,846 B2
(45) Date of Patent: Sep. 17, 2013

(54) CONVERTER ARRANGEMENT AND METHOD FOR PREPARING A CONVERTED SIGNAL

(75) Inventors: Peter Trattler, Graz (AT); Sébastien Poirier, Valencia (ES)

(73) Assignee: AMS AG, Unterpremstaetten (AT)

( * ) Notice: Subject to any disclaimer, the term of this patent is extended or adjusted under 35 U.S.C. 154(b) by 1045 days.

(21) Appl. No.: 12/396,409

(22) Filed: Mar. 2, 2009

(65) Prior Publication Data

US 2009/0243566 A1 Oct. 1, 2009

(30) Foreign Application Priority Data

Feb. 28, 2008 (DE) .......................... 10 2008 011 706

(51) Int. Cl.
*G05F 1/40* (2006.01)
(52) U.S. Cl.
USPC .......................................... 323/282; 323/284
(58) Field of Classification Search
USPC .................. 323/271–277, 282–285, 303
See application file for complete search history.

(56) References Cited

U.S. PATENT DOCUMENTS

| | | | | |
|---|---|---|---|---|
| 6,489,756 | B2 * | 12/2002 | Kanouda et al. | 323/284 |
| 7,319,311 | B2 * | 1/2008 | Nishida | 323/284 |
| 7,420,356 | B2 * | 9/2008 | Hojo | 323/276 |
| 7,602,167 | B2 * | 10/2009 | Trafton et al. | 323/284 |
| 2002/0080631 | A1 | 6/2002 | Kanouda et al. | |
| 2005/0104542 | A1 | 5/2005 | Ito et al. | |
| 2006/0186830 | A1 | 8/2006 | Shami et al. | |
| 2007/0008255 | A1 | 1/2007 | Emek et al. | |

OTHER PUBLICATIONS

N.N. "Compact, high efficiency, high power, flash/torch LED driver with dual interface", ADP1653, Analog Devices, Inc., Rev. B, 2007.

* cited by examiner

*Primary Examiner* — Jessica Han
(74) *Attorney, Agent, or Firm* — McDermott Will & Emery LLP

(57) ABSTRACT

A converter arrangement includes a converter device (200) with a clocked operating mode and a non-clocked operating mode, having a signal input (Si), a control input (Se), and a signal output (So), and a control device (100) for controlling the converter device (200) with a control signal of a constant frequency and at least minimal pulse length in the clocked operating mode. The control device (100) is coupled to the control input (Se) of the converter device (200), and an input of the control device (100) is coupled to the signal output (So) of the converter device (200). An input (1) of the converter arrangement supplies a signal to be converted, that is coupled to the signal input (Si) of the converter device (200). For providing a converted signal, the converter arrangement has an output (2) that is coupled to the signal output (So). Furthermore, a corresponding method for preparing a converted signal is disclosed.

14 Claims, 4 Drawing Sheets

CONVERTER ARRANGEMENT AND METHOD FOR PREPARING A CONVERTED SIGNAL

RELATED APPLICATIONS

This patent application claims the priority of German patent application 10 2008 011 706.4 filed Feb. 28, 2008, the disclosure content of which is hereby incorporated by reference.

FIELD OF THE INVENTION

The invention relates to a converter arrangement and to a method for preparing a converted signal.

BACKGROUND OF THE INVENTION

Converters are devices that convert input signals into output signals of various forms. Converters in various embodiments and with various purposes are widespread, for example, as DC/DC converters and AC/DC converters. DC/DC converters are widespread, for example, in consumer goods. Although the DC/DC converters have a common basic principle, in different applications they have different advantages and disadvantages. A few are better suited for high-power devices, such as, for example, large electric motors, while others are better suited for devices with minimal current consumption, such as mobile telephones.

SUMMARY OF THE INVENTION

It is an object of the invention to provide a converter arrangement and a method for preparing a converted signal that allow a conversion of input signals with minimal noise.

In one embodiment example, a converter arrangement has a clocked operating mode and a non-clocked operating mode and contains a signal input, a control input, and a signal output. The converter arrangement also includes a control device that controls the converter device, wherein the control is performed with a constant frequency in the clocked operating mode. The control device contains at least one input and one output, wherein, on the one hand, the output is coupled to the control input of the converter device and, on the other hand, one input is coupled to the signal output of the converter device. The converter arrangement has an input for supplying a signal to be converted that is coupled to the signal input of the converter device, and an output for preparing a converted signal that is coupled to the signal output of the converter device.

The control device has the function of controlling the converter device. An input signal is converted by the converter device into an output signal. In the clocked operating mode, this happens with a control signal of a constant frequency and at least minimal pulse length. The constant frequency is determined by an internal clock frequency of the control device. In the non-clocked operating mode, the converter arrangement outputs no pulses.

The noise response of the converter arrangement is improved by using a constant frequency, wherein the output signal is converted with this constant frequency. The constant frequency is not less than an internal clock frequency of the converter arrangement. In the arrangement, there is no noise with a frequency that is less than the constant frequency. The bandwidth of the noise is thus less than would otherwise be the case, so that other components of the arrangement, such as filters, can be simpler and more economical.

The described converter arrangement with lower noise is very well suited for noise-sensitive devices, such as high-frequency amplifiers. The converter arrangement generates either no pulses or control signals or else pulses with exactly the clock frequency. For a minimal pulse length, the losses can be minimized in clocked operation. Finally, the properties of the converter arrangement can be predicted, so that an integration into systems operated with high frequency is simple.

It has proven advantageous if the control signal of the control device has a controlled pulse-duty ratio in the clocked operating mode.

In one advantageous embodiment it is provided that the input of the converter arrangement is coupled via a supply potential source to the reference potential terminal and the output is coupled to a reference potential terminal via a load.

The supply potential source can be optionally a battery or an accumulator. The load can be realized in various embodiments, for example, in the form of a light-emitting diode (LED) or an LED arrangement.

In a preferred embodiment it is provided that the converter device includes a first output and a second output, wherein the first output is coupled to a first input of the control device and the second output is coupled to a second input of the control device.

It is advantageously provided that the converter device includes an inductive element that is coupled to the input of the converter device. The converter device further has a diode element as a free-running element that is coupled to the output of the inductive element.

The converter device further includes a switching device with a control input, a first terminal, and a second terminal, wherein the control input of the switching device is coupled to the control input of the converter device. The converter device further includes, with particular advantage, a current measurement device with an output, wherein the switching device and the current measurement device are coupled serially between the output of the inductive element and the reference potential terminal. The output of the current measurement device is coupled to the control device.

The converter device further includes a current source with an input and an output, wherein the input is coupled to the output of the diode element. The output of the current source is coupled to the signal output of the converter device. The converter device advantageously has a capacitive element that is coupled between the input of the current source and a reference potential terminal.

The conversion of the signal to be converted is performed in the converter device. The switching device is turned on and off in the clocked operating mode when needed. In the non-clocked operating mode, the switching device remains in the turned-off state.

A diode, a Schottky diode, or a switched transistor is optionally provided as a diode element. The switching device can be realized with a transistor.

In an advantageous embodiment of the converter arrangement, it is provided that the control device includes a measurement device. The measurement device measures given operating parameters of the converter arrangement. As the operating parameters, in particular, the values of current or voltage are provided. Advantageously, the measurement device receives a measured current signal of the current measurement device and processes the current signal with reference to the current provided by the current source.

The control device has a pulse device that is coupled at one input to the output of the measurement device. On the output side, the pulse device is coupled to the output of the control device or the control input of the converter device. The control device includes an overvoltage protection device. The overvoltage protection device has an input and an output and has the task of protecting the converter arrangement from harmful overvoltages. The input of the overvoltage protection device is coupled to the input of the current source, and the output of the overvoltage protection device is coupled to the input of a switching element.

The operating mode is determined corresponding to the signals of the converter device processed by the measurement device. When the converter arrangement is operated in the non-clocked operating mode, the input signal supplied by the supply potential source is supplied to the inductive element, the diode element, and the current source one after the other. In this operating mode, the switching device remains open, so that a direct path between the reference potential terminal and the inductive element does not exist. The capacitive element at the input of the current source is used for summing the voltage on the voltage-leading terminal of the capacitive element. This voltage is supplied to the current source. The current source generates a current as a function of this voltage.

In the clocked operating mode, the converter device is controlled by the control device with the aid of a control signal. The control signal is generated by the pulse device.

In one advantageous embodiment of the converter arrangement, the measurement device includes an amplifier, in particular, a transimpedance amplifier, with two inputs and one output. The first input is coupled to a terminal of the current source by a voltage source that generates a voltage corresponding to the voltage drop across the current source. The second input is coupled to the other terminal of the current source or the signal output. The measurement device has a filter device with one input and one output, wherein the input is coupled to the output of the amplifier. The measurement device includes an adder device with two inputs and one output. The first input is coupled to the output of the filter device and the second input is coupled to the current measurement device. The adder device subtracts the signal of the current measurement device from the signal of the filter device. The output of the adder device is coupled to the pulse device.

The measurement device is used, in general, for measuring signals of the converter device. With the aid of the measurement results, the operating mode of the converter arrangement as a whole can be determined.

In one embodiment of the converter arrangement, the pulse device includes a comparator, in particular, a PWM (pulse-width-modulated) comparator with two inputs and one output. The first input is coupled to the filter device. The pulse device has a sawtooth generator that is coupled to the second input of the PWM comparator. The pulse device further includes a clock-pulse generator device. The clock-pulse generator device is coupled to the sawtooth generator and controls, with its clock signal, the sawtooth generator and a pulse generator. The input of the clock-pulse generator device is coupled to a control terminal of the pulse device.

The pulse device contains a flip-flop with a set input, a reset input, and an output. The reset input is coupled through an inverter to the control terminal of the pulse device, and the set input is coupled to the output of the PWM comparator. The pulse generator of the pulse device is used for preparing pulses with constant frequency and minimal pulse width. The input of the pulse generator is coupled to the output of the clock-pulse generator device. The pulse device has an AND-gate that has a first input coupled to the output of the flip-flop, and a second input coupled to the output of the pulse device.

The pulse device further contains an OR-gate that has a first input coupled to the output of the PWM comparator, and a second input coupled to the output of the AND-gate. Furthermore, the pulse device has a switching element that is coupled to the OR-gate and the control input of the converter device.

The pulse device has the task of preparing the control signal for controlling the converter device. The control signal generated by the pulse device has a constant frequency and a controlled pulse-duty ratio. The output signal on the output of the converter arrangement is influenced by the control signal. The control signal controls a switching element that is realized with a transistor.

In one embodiment it is provided that the overvoltage protection device includes a comparator with two inputs and one output. A first input of the comparator is coupled to the input of the current source, and the output of the comparator is coupled to the control input of the switching element of the pulse device. The overvoltage protection device further includes a reference voltage source that is coupled between the reference potential terminal and a second input of the comparator.

In one embodiment of the converter arrangement, the pulse device includes another OR-gate with at least two inputs and one output. A first input of the other OR-gate is coupled to the output of the overvoltage protection device, a second input is coupled to the inverter, and the output of the other OR-gate is coupled to the reset input of the flip-flop.

This embodiment offers a switchover between the two operating modes, in particular, when an overvoltage is detected. The converter arrangement is then reset into the non-clocked operating state.

In another embodiment of the converter arrangement, the pulse device contains a comparator having two inputs and one output, wherein this comparator compares the input voltage of the converter arrangement to its output voltage. For this purpose, the pulse device has the series circuit made from a first resistor, a second resistor, and an optional voltage source that generates a voltage corresponding to the voltage drop across the current source and/or corresponding to the losses of the converter arrangement. The first input of the comparator is coupled to the load. The second input of the comparator is coupled to the node between the first and the second resistors. The output of the comparator is coupled to another input of the other OR-gate. The voltage source is coupled to the supply potential source on the signal input.

In this embodiment, the determination of the operating state is made more precise. If the input voltage set by the voltage divider from the two resistors exceeds the output voltage, the converter arrangement is reset into the non-clocked operating state. The optional additional voltage source allows a more precise consideration of the losses of the converter arrangement.

In one embodiment of a method, a converted signal is prepared that is derived in a non-clocked operating mode directly from the signal to be converted on the input of the converter arrangement. In a clocked operating mode, a control signal with a constant frequency and at least minimal pulse width controls the conversion of the signal to be converted into the converted signal.

Both operating modes allow an adaptation of the output signal when needed.

In one advantageous embodiment of the method it is provided that the converter arrangement is operated in the clocked or non-clocked operating mode, corresponding to a threshold that is determined as a function of different parameters of the converter arrangement.

This threshold can be dependent on the load or can be determined as a function of the load.

In another embodiment of the method it is provided that when the signal to be converted is greater than the threshold, the converter arrangement is operated in a non-clocked operating mode, and when the signal to be converted is less than the threshold, the converter arrangement is operated in a clocked operating mode.

In another embodiment of the method it is provided that the control signal is generated in a clocked operating mode from the pulse device with a constant frequency and a variable pulse-duty ratio.

In another embodiment of the method it is provided that the parameters of the converter arrangement are determined from a set including the voltage of the signal to be converted, the voltage of the converted signal, a voltage output by a reference voltage source, a voltage drop across a capacitive element, and resistor losses of the converter arrangement.

BRIEF DESCRIPTION OF THE DRAWINGS

Several embodiments of the converter arrangement will be explained in greater detail below with reference to the schematic figures of the drawing. Elements with the same function or effect here have the same reference symbols.

Shown are.

DETAILED DESCRIPTION OF THE DRAWINGS

Figure 1:
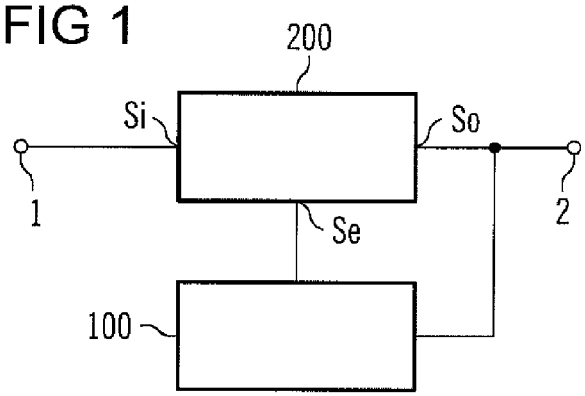
FIG. 1, a first embodiment of a converter arrangement.

FIG. 1 shows a converter arrangement that includes a converter device 200 with a clocked operating mode and a non-clocked operating mode. The converter device has a signal input Si, a control input Se, and a signal output So. The converter arrangement includes a control device 100 in order to control the converter device 200 in a clocked operating mode with a constant frequency and at least minimal pulse width.

The control device 100 has signal inputs and an output that is coupled to the control input Se of the converter device 200. A signal input of the control device 200 is coupled to the signal output So of the converter device 200. The converter arrangement includes an input 1 to which a signal to be converted is supplied, wherein the input 1 is coupled to the signal input Si of the converter device 200. The signal to be converted is converted by the converter device 200. For preparing a converted signal, the converter arrangement has an output 2 that is coupled to the signal output So of the converter device 200.

In the operation of the converter arrangement, the control device 100 determines in what operating mode the converter device is operated. The control device 100 detects the value of the converted signal at the signal output So. As a function of the value of the converted signal, if necessary, a control signal is generated and coupled to the converter device to control the converter device 200 in the clocked operating mode with constant frequency and a controlled pulse-duty ratio. When the converter device 200 is operated in the non-clocked operating mode, the control signal is not generated.

It is advantageous to provide, in the clocked operating mode, a constant frequency of the control signal that is independent of the value of the signal to be converted. The control signal thus has at least a minimal pulse-duty ratio or a minimal pulse length. A control signal period (of a PWM signal) comprises two partial lengths, namely a pulse length having a logic status 1, and a partial length having a logic status 0. The ratio of the pulse length ("logic status 1") to the "logic status 0" length is the pulse duty ratio. The pulse duty ratio may vary, cf. FIG. 8, but the frequency (period length) remains constant. The pulse-duty ratio of the control signal is, apart from the minimal pulse-duty ratio, dependent on the values of the signal to be converted. The frequency of the control signal determines the frequency band of the noise of the converter arrangement. The noise can be easily filtered when the frequency of the control signal is constant and not less than a clock rate internal to the converter arrangement.

Figure 2:
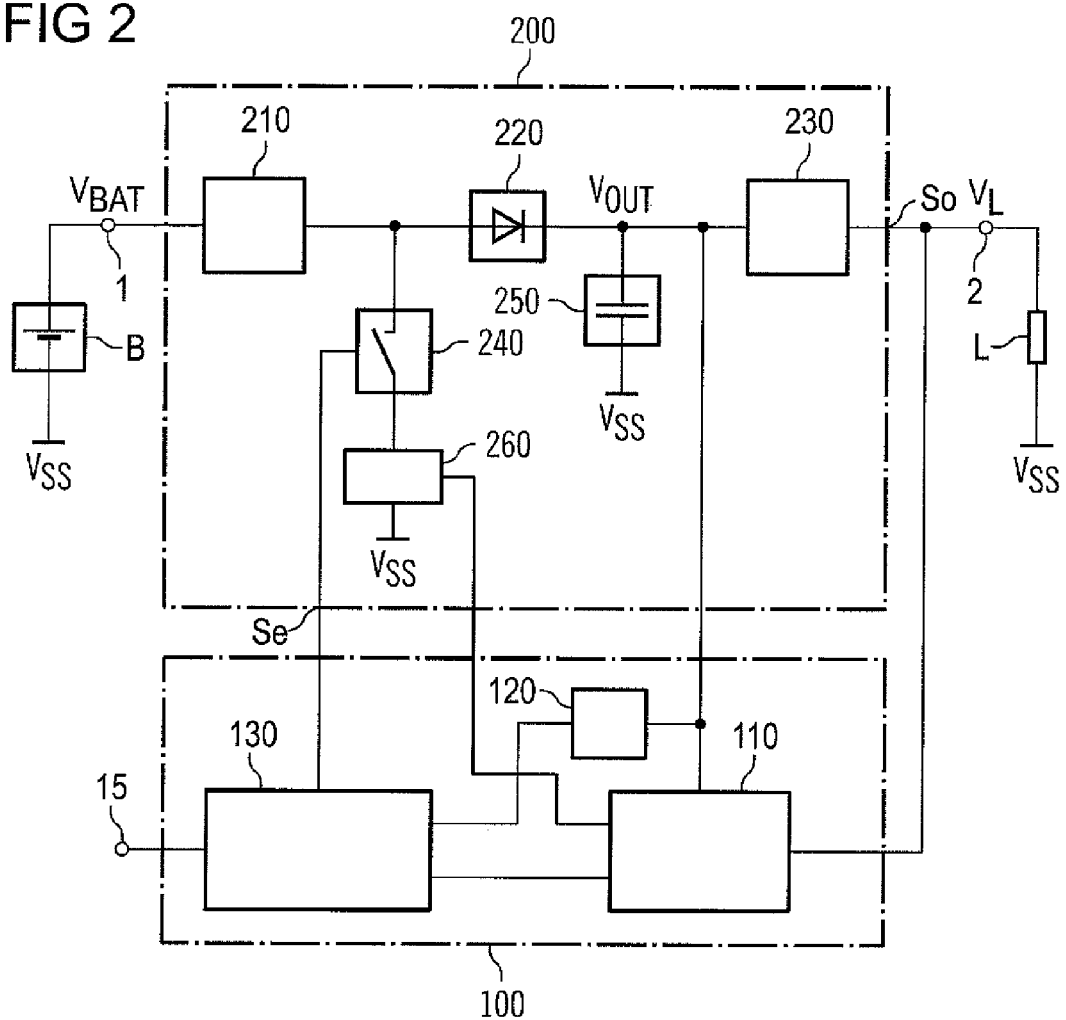
FIG. 2, a second embodiment of a converter arrangement.

FIG. 2 shows another embodiment of the converter arrangement. The input 1 is coupled to a reference potential terminal Vss by a supply potential source B, and the output 2 is coupled to a reference potential terminal Vss by a load L. The output of the converter device is further coupled to an input of the control device 100.

The converter device 200 includes an inductive element 210 that is coupled to the input 1 of the converter device 200. The converter device 200 further has a diode element 220 that is coupled to the inductive element 210. The converter device 200 further includes a switching device 240 with a control input. The control input of the switching device is coupled to the control input Se of the converter device 200. The switched circuit is coupled to the inductive element and the reference potential terminal. As the switching device, in particular, there is a MOS transistor that has a control input forming the gate and a switched circuit including the source-drain path. A bipolar transistor is similarly suitable as a switching device.

The converter device 200 includes a current measurement device 260 with a measurement output. The current measurement device is arranged in series with the switching device. The switching device 240 and the current measurement device 260 are coupled on one side to the inductive element 210 and the diode element 220 and, on the other side, to the reference potential terminal Vss. The measurement output of the current measurement device 260 is coupled to an input of the control device 100.

The converter device 200 has a current source 230 that is coupled at its input to the diode element 220 and to the signal output So or the output 2 of the converter device 200. The converter device 200 further has a capacitive element 250 that is coupled, on one side, to the diode element 220 and the current source 230 and, on the other side, to the reference potential terminal Vss. A potential or a voltage is applied to the node between the diode element 220 and the current source 230. This node is coupled to another input of the control device 100.

The control device 100 includes a measurement device 110 having three inputs and one output. The first input of the control device 100 is coupled to the output of the converter device 200. The second input is coupled to the other input of the control device 100 or the input of the current source, and the third input of the control device 100 is coupled to the output of the current measurement device.

The control device 100 has a pulse device 130. The pulse device includes a control input, a first and a second input, and an output. The first input is coupled to the output of the measurement device 110. The output is coupled to the control input Se of the converter device 200.

The control device 100 includes a control terminal 15 that is coupled to the control input of the pulse device 130. The control device 100 has an overvoltage protection device 120 that is coupled on the input side to the other input of the control device 100. The output of the device 120 is coupled to the second input of the pulse device 130.

In the operation of the converter arrangement, a signal generated by the supply potential source B is supplied to the input 1 as the signal to be converted. The control device 100 is activated on the control input 15. The signal to be converted is supplied to the inductive element 210. The switching device 240 has, in the non-clocked operating mode, an opened output circuit. A transistor as the switching device is disabled in this case, so that no current flows in the switched output circuit. The signal to be converted is thus converted, without clock pulse control, into the converted signal.

The output signal of the inductive element is rectified with the aid of the diode element 220. The voltage $V_{OUT}$ is applied to the capacitive element 250. The downstream current source 230 generates an output current that is supplied on the output of the converter device of the load L.

The measurement device 110 measures the values of the output current and generates an output signal for the pulse device 130.

The overvoltage protection device 120 is used for protection from a voltage $V_{OUT}$ that is too large, in particular, when the load is not functioning normally. The overvoltage protection device 120 is here coupled to the pulse device 130. The pulse device 130 generates a control signal for the control input Se of the converter device that is derived from the measurement values of the measurement device. In the clocked operating mode, this control signal includes pulses of constant frequency and with at least minimal pulse width.

In the clocked operating mode, the control signal generated by the pulse device is supplied to the control input Se of the switching device 240. This control signal controls the clocked turning on and off of the switching device 240. A transistor as a switching device has either a completely disabled (off) or very good conducting (on) output circuit. This has the advantage that the complexity of the pulse device for generating the control signal is low, because only two switching states exist that also generate no or only slight losses. A transistor is therefore controlled either with a constant gate-source voltage $V_{GS}$ significantly above or significantly less than the threshold voltage, which also keeps the operating losses low. An operation of the transistor in the region of the threshold voltage and the losses associated with this, like those that can occur in the linear operating state or, e.g., for a pulse amplitude modulation, requires a complex and expensive control of the transistor that is not necessary for the switching device 240.

In the closed state of the switching device 240, a low-impedance current path exists between the inductive element 210 and the reference potential terminal Vss. This allows the measurement of the current flowing through the switching device 240 with the aid of the current measurement device 260 that has an output signal forwarded to the measurement device 110.

In the clocked operating mode, the switchover of the switching device 240 is also performed with constant frequency. The inductive element 210 is used for storing energy in the clocked operating mode when the current path exists between the inductive element 210 and the reference potential terminal. When the switching device 240 is turned off or opened, the stored energy is supplied with the aid of the free-running properties of the diode element 220 to the capacitive element 250 and the current source 230.

The switchover between the operating modes is determined by a limit condition:

$$V_{BAT} > V_{OUT} + V_{CURR} + V_L + VR;$$

where $V_{BAT}$ represents the voltage of the supply potential source B, $V_{OUT}$ represents the voltage applied to the capacitive element 250, $V_L$ represents the load voltage, $V_{CURR}$ represents the voltage of a reference voltage source 118 (FIG. 3), and VR represents the losses of the converter arrangement.

When the limit condition is fulfilled, the converter arrangement works in the non-clocked operating mode, otherwise in the clocked operating mode.

Figure 3:
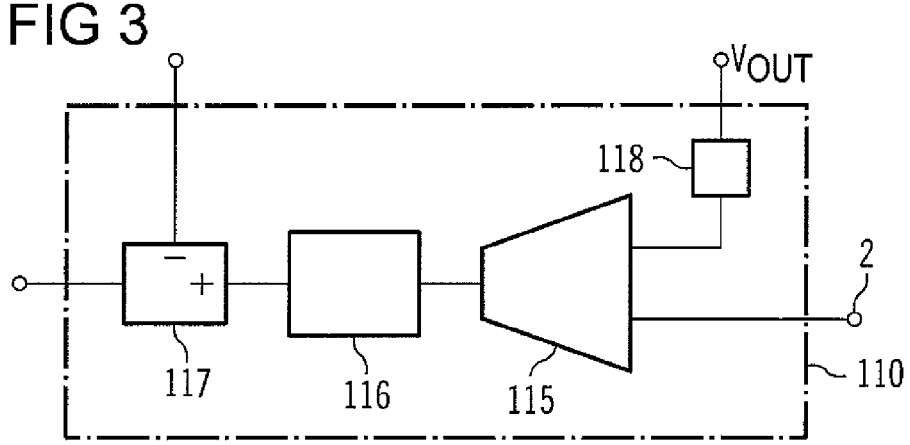
FIG. 3, an embodiment of a measurement device.

FIG. 3 shows an embodiment of the measurement device 110. The measurement device 110 includes an amplifier 115 having two inputs and one output. The first input is coupled to the additional input of the measurement device 110 or, via the reference voltage source 118, to the input of the current source 230. The reference voltage source 118 is dimensioned so that it generates a voltage that corresponds to the minimum voltage compliance via the current source 230. The second input of the measurement device 110 is coupled to the output of the converter device 200. The amplifier 115 compares the signal $V_{CURR}$ of the desired current to the signal $V_L$ that represents the load current. The amplifier 115 is formed, in particular, as a transimpedance amplifier (OTA).

The measurement device 110 further includes a filter device 116 having one input and one output. The input is coupled to the output of the amplifier 115. The measurement device also has an adder device 117 having two inputs and one output. The first input is coupled to the output of the filter device 116. The second input is coupled to the output of the current measurement device 260. The adder device subtracts the signal of the current measurement device from the signal of the filter device. In this way, the so-called slope compensation is realized.

In the operation of the measurement device 110, signals are supplied to the two inputs of the amplifier 115. The signal provided by the voltage source 118 is compared to the signal that can be picked up on the output of the converter device 200. The amplifier converts the difference between the two signals into a current. The filter device 116 is used for stabilization. The current provided by the amplifier is supplied to the filter device 116 and is filtered corresponding to stability criteria and also converted into a voltage. The voltage filtered in this way on the output of the filter device is then supplied to the adder device 117. The signal that can be picked up on the output of the current measurement device is subtracted from the filtered signal. The difference signal formed in this way is forwarded to the pulse device.

Figure 4:
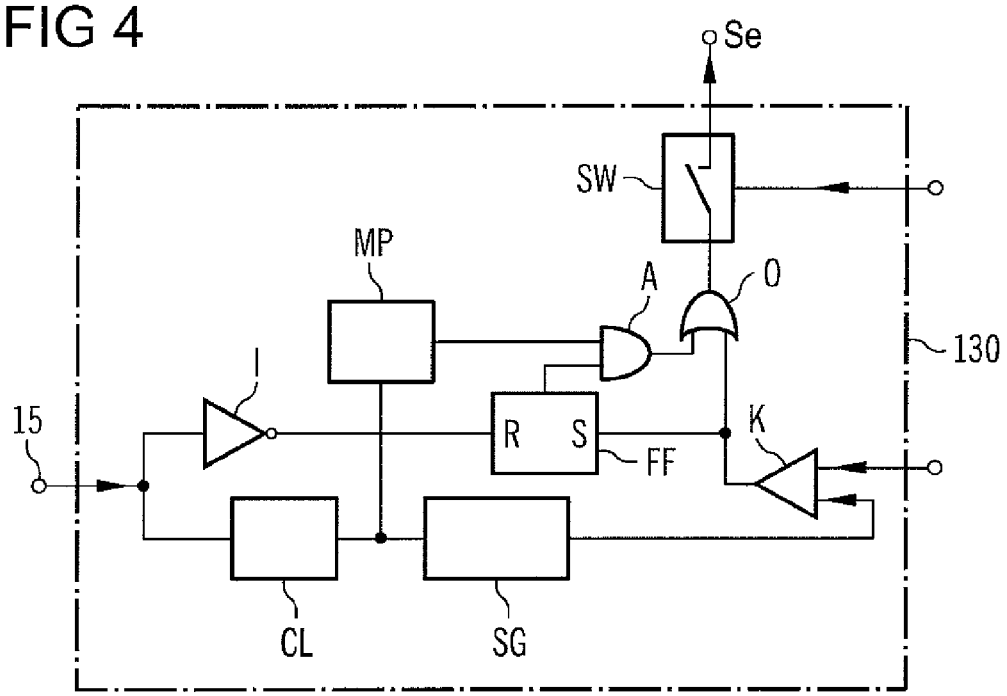
FIG. 4, a first embodiment of a pulse device.

FIG. 4 shows an embodiment of the pulse device 130. The pulse device 130 includes a comparator K that is designed, in particular, as a PWM comparator for pulse width modulation (PWM) having two inputs and one output. The first input is coupled to the output of the adder device 117. The pulse device 130 has a sawtooth generator SG that has an output coupled to the second input of the comparator K. The pulse device further includes a clock-pulse generator device CL that has an output coupled to the input of the sawtooth generator SG, and an input coupled to the control input 15 of the pulse device 130. The pulse device 130 further has a flip-flop FF with a set input S, a reset input R, and an output. The reset input R is coupled through an inverter I to the control input 15 of the pulse device. The set input S is coupled to the output of the PWM comparator K.

The pulse device 130 further includes a pulse generator MP for providing pulses with minimum pulse width and that has an input coupled to the output of the clock-pulse generator device CL. The pulse device 130 further has a logical AND-gate A having two inputs and one output. One of the inputs is coupled to the output of the flip-flop FF, and the other input is coupled to the output of the pulse generator MP. The pulse device further includes a logical OR-gate O with two inputs and one output. One of the inputs is coupled to the output of the comparator K, and the other input is coupled to the output of the AND-gate A. The pulse device 130 includes a switching element SW having a control input that is coupled to the output of the overvoltage protection device. The output circuit of the switching element SW is coupled between the output of the OR-gate O and the control input Se of the converter device 200.

In the operation of the pulse device 130, a control signal is supplied to the control terminal 15. The control signal activates the clock-pulse generator device CL and resets the flip-flop FF. A clock signal of the clock-pulse generator device CL is supplied to the sawtooth generator SG and also to the pulse generator MP. The task of the pulse generator MP is to generate pulses of constant frequency with a given minimum pulse width. In particular, the constant frequency is not less than the internal clock frequency of the clock-pulse generator device CL. The sawtooth generator generates a sawtooth signal with the same frequency as the pulse generator. The sawtooth signal generated by the sawtooth generator is supplied to the comparator K. The signal of the adder device coming from the measurement device is supplied to the other input of the comparator K. On the output, the comparator generates a signal as a function of the signals output from the measurement device and the sawtooth generator.

As soon as the signal generated at the output of the comparator becomes a logical 1, the flip-flop FF is set. When the flip-flop is set, on the output of the flip-flop is a logical 1 that allows the pulses output by the pulse generator MP to be passed through the AND-gate A. The pulses are then supplied to the OR-gate. The OR-gate O requires a logical 1, so that it also generates a 1 on the output. For the activated switching element SW, control pulses with constant frequency and at least minimum pulse width are provided on the control input Se. When required by the operating state, the pulse-duty ratio of the control signal is increased with longer pulse widths for a constant frequency.

The functionality described in this way allows the pulse device 130 to generate a control signal with constant frequency and different pulse-duty ratios. The flip-flop FF is then set when the converter arrangement reaches the clocked operating mode for the first time and then reset only when the converter arrangement is turned off.

The switching element SW is operated in an open operating mode only when a control signal from the overvoltage protection device 120 opens the switching element. In this situation, no control signal is generated.

Figure 5:
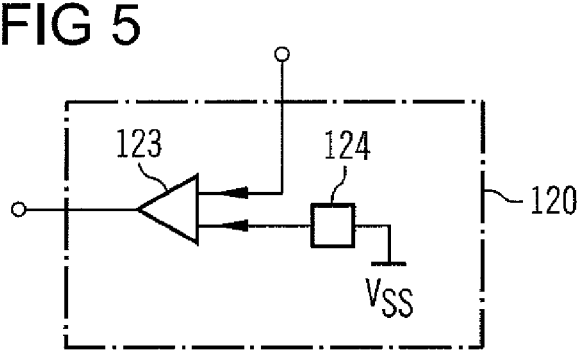
FIG. 5, an embodiment of an overvoltage protection device.

FIG. 5 shows an embodiment of the overvoltage protection device 120. The overvoltage protection device 120 includes a comparator 123 having two inputs and one output. One input is coupled to the node between the diode element 220 and the current source 230 and has the potential $V_{OUT}$. The overvoltage protection device 120 has a reference voltage source 124 that has a first terminal coupled to a reference potential terminal Vss, and an output coupled to the second input of the comparator 123.

In the operation of the overvoltage protection device 120, the potential $V_{OUT}$ is compared to the signal that comes from the reference voltage source 124, and this is a measure of an overvoltage. An overvoltage can occur, for example, when the load on the output of the converter arrangement is defective. If the potential $V_{OUT}$ is greater than the signal output by the reference voltage source 124, then an output signal is generated by the comparator 123. This signal is used for opening the switching element SW that is closed in the normal case and that is located in the pulse device 130.

Figure 6:
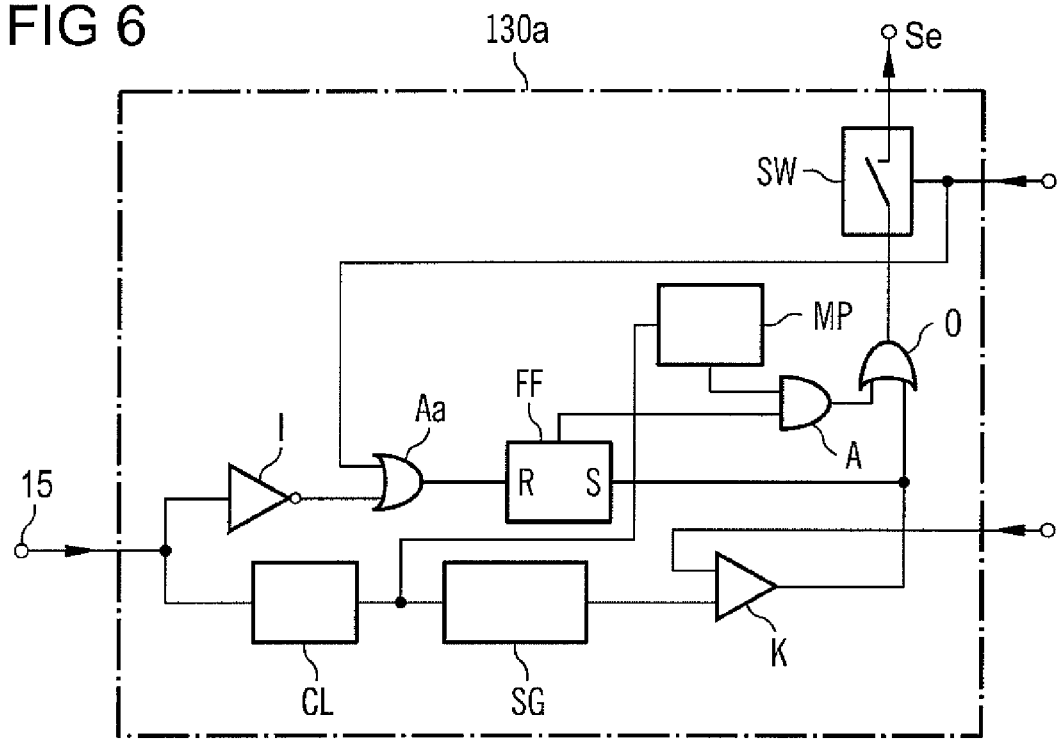
FIG. 6, a second embodiment of a pulse device.

FIG. 6 shows a second embodiment of a pulse device 130a that contains an additional OR-gate Aa relative to the pulse device 130 according to FIG. 4. The additional OR-gate Aa is coupled at a first input to the output of the overvoltage protection device. A second input of the gate Aa is coupled to the inverter I, while the output is coupled to the reset input R of the flip-flop FF.

The task of the OR-gate Aa in the operation of the pulse device 130a is to reset the flip-flop FF when the overvoltage protection device detects an overvoltage and provides a corresponding signal. The converter device is therefore reset to the normal or non-clocked operating state.

Figure 7:
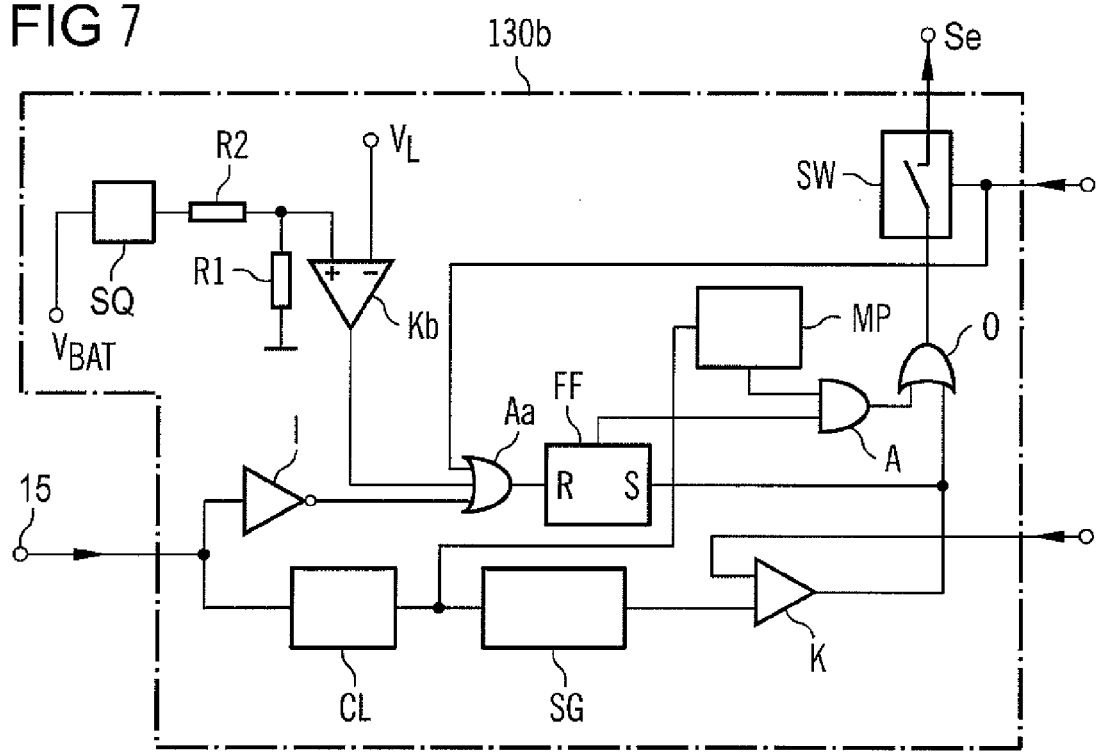
FIG. 7, a third embodiment of a pulse device.

FIG. 7 shows a third embodiment of the pulse device 130b that also compares the battery voltage $V_{BAT}$ to the load voltage $V_L$ relative to the pulse device 130a according to FIG. 6. For this purpose, a comparator Kb, a voltage divider with the resistors R1 and R2, and optionally a voltage source SQ are used.

The pulse device 130b contains the first resistor R1 and the second resistor R2 connected in series. The optional voltage source SQ, which generates a voltage corresponding to the voltage drop across the current source 230 and/or other losses of the converter arrangement, is also connected in series with R1 and R2. The pulse device 130b further includes the comparator Kb having two inputs and one output. The first input is coupled to the load L, and the second input is coupled to the node between the resistors R1 and R2. R1 is coupled at its other terminal to the reference potential terminal Vss, while R2 is coupled at its second terminal to the voltage source SQ or the voltage $V_{BAT}$ of the supply potential source B. The output of the comparator Kb is coupled to another input of the OR-gate Ab.

In the operation of the pulse device 130b, the comparator Kb generates an output signal on its output when the voltage $V_{BAT}$ is large enough to drive the load L directly, wherein the losses of the converter arrangement are optionally taken into consideration with the aid of the voltage source SQ. The output signal on the output of the comparator Kb is supplied to the OR-gate Ab and is used for resetting the flip-flop, in order to turn on the non-clocked operating mode.

Figure 8:
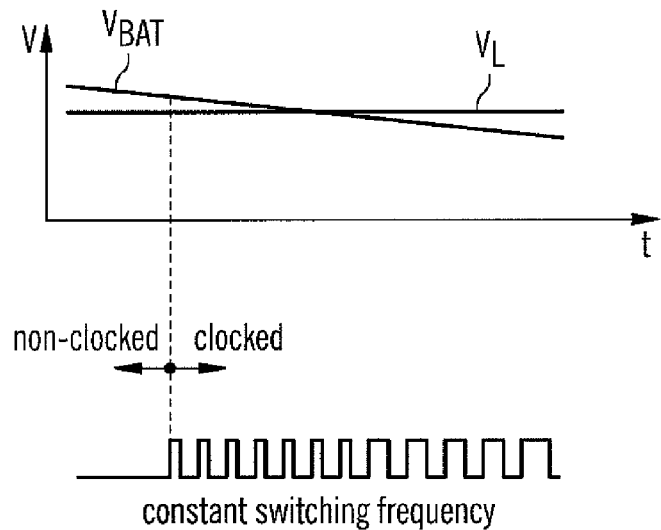
FIG. 8, a diagram for explaining the clocked operating state.

FIG. 8 explains the clocked operating state with reference to the voltages $V_{BAT}$ on the converter input 1 and $V_L$ on the load L. As soon as the clocked operating state is turned on for the first time, the pulse device generates a clocked control signal. Even if $V_{BAT}$ is somewhat larger than $V_L$ and the load L could be driven directly, the pulse device generates a control signal with minimum pulse-duty ratio or minimum pulse width. Therefore, the noise response of the converter arrangement is improved relative to an operation in which control signal pulses are generated only occasionally. Filters for $V_{BAT}$ and/or the load L can be implemented in an easier and more economical way. As soon as the voltage $V_{BAT}$ of the supply potential source B falls below the load voltage $V_L$, the pulse-duty ratio of the control signal becomes larger, and indeed, is a function of the difference in the voltages, while the frequency of the control signal remains constant.

Figure 9:
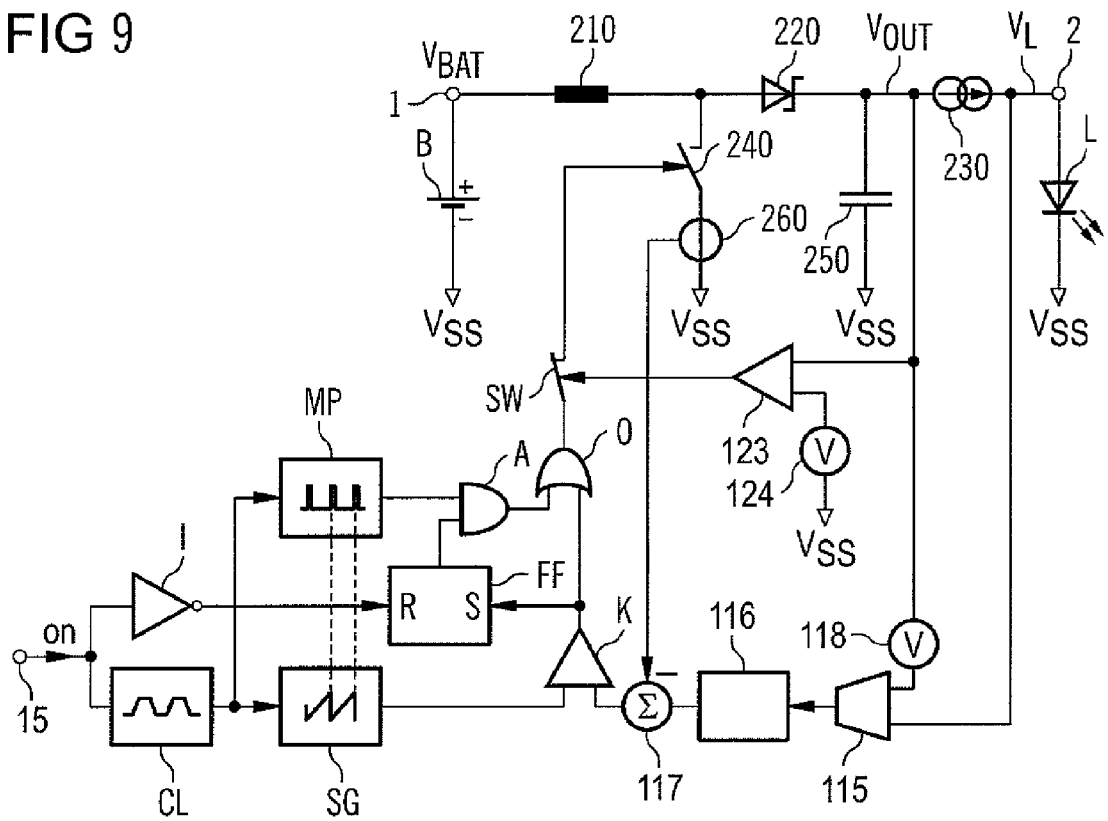
FIG. 9, an implementation of the converter arrangement according to the combined FIGS. 2-5.

FIG. 9 shows an implementation of the converter arrangement according to FIGS. 2-5 in which the block circuit symbols are shown by functional symbols like those often used in electrical engineering. Elements the same as those in FIG. 2 are provided with the same reference symbols. An LED is used as the load L. For describing the function of the circuit, reference is made to FIGS. 2-5.

We claim:

1. A converter arrangement comprising:
a converter device provided for operation alternatively in one of two operating modes consisting of a single clocked operating mode and a single non-clocked operating mode, having a signal input, a control input, and a signal output;
a control device adapted to control the converter device in the clocked operating mode with a pulsed control signal of a constant frequency having a controlled pulse-duty ratio with at least a minimal pulse length, wherein an output of the control device is coupled to the control input of the converter device, and an input of the control device is coupled to the signal output of the converter device;
an input adapted for supplying a signal to be converted that is coupled to the signal input of the converter device; and
an output, adapted for providing a converted signal, that is coupled to the signal output of the converter device.

2. A converter arrangement comprising:
a converter device with a clocked operating mode and a non-clocked operating mode, having a signal input, a control input, and a signal output;
a control device adapted to control the converter device in a clocked operating mode with a pulsed control signal of a constant frequency an minimal pulse length, wherein an output of the control device is coupled to the control input of the converter device, and an input of the control device is coupled to the signal output of the converter device;
an input adapted for supplying a signal to be converted that is coupled to the signal input of the converter device;
an output, adapted for providing a converted signal, that is coupled to the signal output of the converter device;
an inductive element coupled to the input of the converter device;
a diode element coupled to the inductive element;
a circuit device coupled to the inductive element and having a switch input that is coupled to the control input of the converter device;
a current measurement device for detecting the current by the switching device, wherein the output of the current measurement device is coupled to an input of the control device; and
a current source coupled to the diode element, to the control device, and to the output of the converter arrangement.

3. The converter arrangement according to claim 2, comprising a capacitive element coupled between an input of the current source and a reference potential terminal.

4. The converter arrangement according to claim 2, wherein the control device comprises:
a measurement device coupled on an input side to the current source and the current measurement device;
a pulse device coupled at one input to the measurement device;
a control terminal coupled to a control input of the pulse device; and
an overvoltage protection device coupled to the current source and to a second input of the pulse device.

5. The converter arrangement according to claim 4, wherein the measurement device comprises:

an amplifier coupled to the signal output and to the current source by a voltage source that generates a voltage corresponding to a voltage drop across the current source;
a filter device coupled on an input side to an output of the amplifier; and
an adder device coupled at one input to an output of the filter device and that is coupled at a second input to the current measurement device.

6. The converter arrangement according to claim 4, wherein the pulse device comprises:
a comparator having inputs coupled to the measurement device and to a sawtooth generator;
a clock generator device coupled to an input of the sawtooth generator and having an input coupled to the control terminal of the pulse device;
a flip-flop having a set input and a reset input, wherein the reset input is coupled to the control terminal of the pulse device, and the set input is coupled to an output of the comparator;
a pulse generator for preparing pulses with constant frequency and minimum pulse width having an input coupled to the clock generator device;
an AND-gate having inputs coupled to the flip-flop and the pulse generator;
an OR-gate having inputs coupled to the comparator and to an output of the AND-gate; and
a switching element coupled between an output of the OR-gate and the control input of the converter device, and to a control input coupled to the overvoltage protection device.

7. The converter arrangement according to claim 6, further comprising another OR-gate coupled at two inputs to the control terminal and to the overvoltage protection device, and having an output coupled to the reset input of the flip-flop.

8. The converter arrangement according to claim 7, wherein the pulse device includes a comparator to which, at a first input, a voltage is supplied that corresponds to a voltage drop across a load and to which, at a second input, a voltage is supplied that is coupled to a voltage drop across a supply potential source and that has an output coupled to another input of the other OR-gate.

9. The converter arrangement according to claim 4, wherein the overvoltage protection device includes a comparator having inputs coupled to the current source and to a reference voltage source.

10. A method for preparing a converted signal with a converter arrangement provided for operation alternatively in one of two operating modes consisting of a single clocked operating mode and a single non-clocked operating mode, comprising the steps of:
in the non-clocked operating mode of the converter arrangement, preparing a signal to be converted as a non-clocked, converted signal at an output of the converter arrangement; and
in the clocked operating mode of the converter arrangement, providing a pulsed control signal with a constant frequency having a controlled pulse-duty ratio with at least a minimal pulse length to control the conversion of the signal to be converted into the converted signal.

11. The method according to claim 10, wherein the converter arrangement is operated according to a threshold value that is defined as a function of operating parameters of the converter arrangement in the non-clocked or in the clocked operating mode.

12. The method according to claim 11, wherein the converter arrangement is operated in the non-clocked operating mode when the signal to be converted is greater than the threshold value, and is operated in the clocked operating mode when the signal to be converted is less than the threshold value.

13. The method according to claim 11, wherein the operating parameters of the converter arrangement are defined from a set including a voltage of the signal to be converted, a voltage of the converted signal, a voltage output by a reference voltage source, a voltage drop across a capacitive element, and resistance losses of the converter arrangement.

14. The method according to claim 10, comprising generating a control signal with a variable pulse-duty ratio by a pulse device in the clocked operating mode.

* * * * *

UNITED STATES PATENT AND TRADEMARK OFFICE
CERTIFICATE OF CORRECTION

| | | |
|---|---|---|
| PATENT NO. | : 8,536,846 B2 | Page 1 of 1 |
| APPLICATION NO. | : 12/396409 | |
| DATED | : September 17, 2013 | |
| INVENTOR(S) | : Peter Trattler et al. | |

It is certified that error appears in the above-identified patent and that said Letters Patent is hereby corrected as shown below:

IN THE CLAIMS:

In Column 11, Line 31

Replace "a constant frequency an minimal pulse length"

with -- a constant frequency and a given, at least minimal pulse length --.

Signed and Sealed this
Eleventh Day of March, 2014

Michelle K. Lee
*Deputy Director of the United States Patent and Trademark Office*